(12) United States Patent
Taguchi et al.

(10) Patent No.: US 10,941,890 B2
(45) Date of Patent: Mar. 9, 2021

(54) SOCKET AND PIPE CONNECTOR HAVING SAME

(71) Applicant: DAISEN Co., Ltd., Ota (JP)

(72) Inventors: Hiroaki Taguchi, Gunma (JP); Toshiharu Horikoshi, Kiryu (JP)

(73) Assignee: DAISEN CO., LTD., Ota (JP)

( * ) Notice: Subject to any disclaimer, the term of this patent is extended or adjusted under 35 U.S.C. 154(b) by 0 days.

(21) Appl. No.: 16/611,060

(22) PCT Filed: Jun. 5, 2018

(86) PCT No.: PCT/JP2018/021605
§ 371 (c)(1),
(2) Date: Nov. 5, 2019

(87) PCT Pub. No.: WO2018/230401
PCT Pub. Date: Dec. 20, 2018

(65) Prior Publication Data
US 2020/0132233 A1    Apr. 30, 2020

(30) Foreign Application Priority Data

Jun. 15, 2017    (JP) .............................. JP2017-117966

(51) Int. Cl.
*F16L 37/23*    (2006.01)
*F16L 37/46*    (2006.01)

(52) U.S. Cl.
CPC .............. *F16L 37/23* (2013.01); *F16L 37/46* (2013.01)

(58) Field of Classification Search
CPC .................................. F16L 37/23; F16L 37/46
(Continued)

(56) References Cited

U.S. PATENT DOCUMENTS 5,074,524 A    12/1991 Wade
6,089,539 A *   7/2000 Kouda .................... F16L 37/23
                                                  251/149.2
(Continued)

FOREIGN PATENT DOCUMENTS

DE    10 2009 035 380 A1    2/2011
JP         200-55272 A       2/2000
(Continued)

OTHER PUBLICATIONS

International Search Report dated Aug. 21, 2018, issued in counterpart International Application No. PCT/JP2018/021605, with English Translation. (4 pages).

*Primary Examiner* — Kevin L Lee
(74) *Attorney, Agent, or Firm* — Westerman, Hattori, Daniels & Adrian, LLP (57) ABSTRACT

The present invention provides a socket compatible with multiple types of plugs having front end portions varying in length and a pipe connector having this socket. The socket 10 of the present invention mainly includes a base portion 18, first steel balls 22 and second steel balls 24 housed in housing holes of the base portion 18, an outer support portion 26 supporting the first steel balls 22 and the like from the outer side, and an inner support portion 25 supporting the first steel balls 22 and the like from the inner side. The socket 10 includes first housing holes 50 in which the first steel balls 22 are housed and second housing holes 52 in which the second steel balls 24 are housed and which are longer than the first housing holes 50 in an axial direction.

4 Claims, 8 Drawing Sheets

(58) Field of Classification Search
USPC .................................................. 251/149.6
See application file for complete search history.

(56) References Cited

U.S. PATENT DOCUMENTS

| | | | |
|---|---|---|---|
| 6,511,100 B1 | 1/2003 | Le Clinche | |
| 6,568,717 B1 | 5/2003 | Le Clinche | |
| 9,464,742 B2 * | 10/2016 | Taguchi et al. | ..... F16L 37/0841 |
| 10,215,319 B2 * | 2/2019 | Gennasio et al. | ...... F16L 37/23 |
| 2009/0166571 A1 | 7/2009 | Asai et al. | |

FOREIGN PATENT DOCUMENTS

| | | |
|---|---|---|
| JP | 2001-146995 A | 5/2001 |
| JP | 2002-531789 A | 9/2002 |
| JP | 2007-162901 A | 6/2007 |
| JP | 4792838 B2 | 10/2011 |
| JP | 2012-31956 A | 2/2012 |
| JP | 2012-215219 A | 11/2012 |
| JP | 2015-25522 A | 2/2015 |

* cited by examiner

Rear side ←——→ Front side

FIG.2B

Rear side ←——→ Front side

Rear side ←---→ Front side

Rear side ←----→ Front side

Rear side ← → Front side

Rear side ←·······→ Front side

SOCKET AND PIPE CONNECTOR HAVING SAME

TECHNICAL FIELD

The present invention relates to a socket compatible with multiple types of plugs having front end portions varying in length and to a pipe connector having the socket.

BACKGROUND ART

Generally, a socket is provided in an air supply port of an air compressor which supplies compressed air to a nail gun driven by compressed air and a plug is provided in one end portion of a hose which is connected to the socket of the air supply port. Moreover, a socket is provided in the other end portion of the hose and a plug is provided in a pneumatic tool such as a nail gun which is connected to the socket in the other end portion of the hose and which is driven by the compressed air. When the plugs are inserted, fixed and connected to the sockets, the compressed air can be supplied from the air supply port of the air compressor to the inside of the hose. The general sockets and plugs are described in, for example, Patent Document 1 listed below.

Moreover, Patent Documents 2 and 3 listed below describe configurations which facilitate the connection of the plug and the socket.

In Patent Document 2, referring to FIG. 1 and others, multiple lock ball fitting holes are formed in a small outer diameter portion of a socket main body and are arranged in a circumferential direction. The fitting holes are holes elongated in the axial direction and some of the lock ball fitting holes are long holes extending toward the front end more than the other lock ball fitting holes.

In Patent Document 3, referring to FIG. 1 and others, a lock sleeve is arranged inside a tubular socket main body and notch portions are provided on extended lines of ball stopping pieces in the lock sleeve. When the tubular socket main body and a plug is connected, lock balls enter gaps between the ball stopping pieces and ball pressing-down pieces in the notch portions.

Patent Document 4 describes a compressed air taking out apparatus in which insertion of a high pressure plug and a low pressure plug into couplers is partially restricted. Specifically, both of the low pressure plug and the high pressure plug can be inserted into a low pressure coupler. Meanwhile, only the high pressure plug can be inserted into a high pressure coupler and the low pressure coupler cannot be inserted. Such a configuration can improve safety of the compressed air taking out apparatus.

PRIOR ART DOCUMENTS

Patent Documents

Patent Document 1: Japanese Patent Application Publication No. 2000-55272
Patent Document 2: Japanese Patent Application Publication No. 2001-146995
Patent Document 3: Japanese Patent Application Publication No. 2012-31956
Patent Document 4: Japanese Patent No. 4792838

SUMMARY OF THE INVENTION

Problems to be Solved by the Invention

However, the pipe connectors described in Patent Documents 1 to 3 have the following problem: only one type of plug can be inserted and fitted to the socket in principle; thus, when various types of plugs are used in a plant or the like, as many types of sockets as the types of plugs need to prepared and this increases the cost of capital expenditure for the plant.

Moreover, in the compressed air taking out apparatus described in Patent Document 4, both of the low pressure plug and the high pressure plug can be inserted into the low pressure coupler and one coupler is thus compatible with multiple plugs but not the other way around. Accordingly, Patent Document 4 has a problem of insufficient compatibility.

The present invention has been made in view of the aforementioned problems and an object of the present invention is to provide a socket compatible with multiple types of plugs having front end portions varying in length and a pipe connector having this socket.

Means for Solving the Problems

The socket of the present invention includes: a base portion having a substantially cylindrical shape; a valve element housed in the base portion; a plurality of first steel balls housed in first housing holes which are provided to penetrate the base portion; a second steel ball housed in a second housing hole which penetrates the base portion and which is formed to be longer than the first housing holes in an axial direction; a ring-shaped inner support portion supporting the first steel balls and the second steel ball from an inner side and being movable in the axial direction; a ring-shaped outer support portion supporting the first steel balls and the second steel ball from an outer side and being movable in the axial direction and a turning direction; a first biasing unit configured to apply biasing force to the valve element in the axial direction; a second biasing unit configured to apply biasing force to the inner support portion in the axial direction; a third biasing unit configured to apply biasing force to the outer support portion in the axial direction and the turning direction, wherein the socket is capable of being set to an inserted state in which a plug is inserted in an airtight state, a semi-inserted state in which the plug is inserted in a non-airtight state, and a non-inserted state in which the plug is pulled out, the socket allows insertion of a first plug in which an increased-diameter portion is formed in an intermediate portion thereof and a second plug in which a length of a front end portion protruding forward from the increased-diameter portion is longer than that in the first plug, as the plug, in the inserted state, the increased-diameter portion of the plug is engaged with the first steel balls coming into contact with first grooves provided on an inner surface of the outer support portion and thereby being arranged at inner positions in a radial direction, and the second steel ball is movable in the axial direction in the second housing hole, in the semi-inserted state, as a result of moving the outer support portion in the turning direction, the first steel balls are housed in second grooves, being deeper than the first grooves and provided on the inner surface of the outer support portion, and thus are arranged at outer positions in the radial direction, and the increased-diameter portion of the plug is disengaged from the first steel balls and engaged with the second steel ball, and in the non-inserted state, as a result of moving the outer support portion in the axial direction, the first steel balls and the second steel ball are arranged at outer positions in the radial direction, and the increased-diameter portion of the plug is disengaged from the second steel ball.

Moreover, the socket of the present invention includes an O-ring provided inside the inner support portion, and the O-ring comes into contact with a front end surface of the first plug when the first plug is inserted, and comes into contact with an outer side surface of the second plug when the second plug is inserted.

Furthermore, in the socket of the present invention, the O-ring includes a first protruding portion protruding toward an inner side in the radial direction and a second protruding portion protruding toward the inner side more than the first protruding portion, an outer side surface of the first plug comes into contact with the first protruding portion when the first plug is inserted, and the outer side surface of the second plug comes into contact with the second protruding portion when the second plug is inserted.

Moreover, in the socket of the present invention, in the inserted state, the increased-diameter portion of the plug is engaged with the first steel balls and an outer end portion of the inner support portion comes into contact with the first steel balls.

Furthermore, a pipe connector of the present invention includes the socket described above; and a plug configured to be inserted into the socket.

Effects of the Invention

The socket of the present invention includes: the base portion having the substantially cylindrical shape; the valve element housed in the base portion; the plurality of first steel balls housed in first housing holes which are provided to penetrate the base portion; the second steel ball housed in the second housing hole which penetrates the base portion and which is formed to be longer than the first housing holes in the axial direction; the ring-shaped inner support portion supporting the first steel balls and the second steel ball from the inner side and being movable in the axial direction; the ring-shaped outer support portion supporting the first steel balls and the second steel ball from the outer side and being movable in the axial direction and the turning direction; the first biasing unit configured to apply the biasing force to the valve element in the axial direction; the second biasing unit configured to apply the biasing force to the inner support portion in the axial direction; the third biasing unit configured to apply the biasing force to the outer support portion in the axial direction and the turning direction, wherein the socket is capable of being set to the inserted state in which the plug is inserted in the airtight state, the semi-inserted state in which the plug is inserted in the non-airtight state, and the non-inserted state in which the plug is pulled out, the socket allows insertion of the first plug in which the increased-diameter portion is formed in the intermediate portion thereof and the second plug in which the length of the front end portion protruding forward from the increased-diameter portion is longer than that in the first plug, as the plug, in the inserted state, the increased-diameter portion of the plug is engaged with the first steel balls coming into contact with first grooves provided on the inner surface of the outer support portion and thereby being arranged at inner positions in the radial direction, and the second steel ball is movable in the axial direction in the second housing hole, in the semi-inserted state, as a result of moving the outer support portion in the turning direction, the first steel balls are housed in the second grooves, being deeper than the first grooves and provided on the inner surface of the outer support portion, and thus are arranged at the outer positions in the radial direction, and the increased-diameter portion of the plug is disengaged from the first steel balls and engaged with the second steel ball, and in the non-inserted state, as a result of moving the outer support portion in the axial direction, the first steel balls and the second steel ball are arranged at the outer positions in the radial direction, and the increased-diameter portion of the plug is disengaged from the second steel ball. Since the second steel ball is housed in the second housing hole formed to be elongated in the axial direction, the second steel ball can move in the second housing hole. Thus, in the inserted state, the second steel ball can be arranged at a predetermined position in the second housing hole depending on the length of the front end portion of the plug. Moreover, engaging the increased-diameter portion of the plug with the second steel ball arranged in an axial direction outer end portion of the second housing hole in the semi-inserted state can prevent the plug from being uncoupled from the socket in the semi-inserted state. Furthermore, bringing the outer end portion of the inner support portion into contact with the second steel ball arranged in the axial direction outer end portion of the second housing hole in the semi-inserted state can determine the position of the inner support portion.

Moreover, the socket of the present invention includes the O-ring provided inside the inner support portion, and the O-ring comes into contact with the front end surface of the first plug when the first plug is inserted, and comes into contact with the outer side surface of the second plug when the second plug is inserted. Accordingly, when the first plug with the short front end portion is inserted, the air-tightness inside the socket can be maintained by the contact of the front end surface of the first plug with the O-ring. Moreover, when the second plug with the long front end portion is inserted, the air-tightness inside the socket can be maintained by the contact of the outer side surface of the plug with the O-ring. Accordingly, even when any of plugs having the front end portions varying in length is inserted, it is possible to secure the air-tightness in the insertion and prevent compressed fluid from leaking to the outside.

Furthermore, in the socket of the present invention, the O-ring includes the first protruding portion protruding toward the inner side in the radial direction and the second protruding portion protruding toward the inner side more than the first protruding portion, the outer side surface of the first plug comes into contact with the first protruding portion when the first plug is inserted, and the outer side surface of the second plug comes into contact with the second protruding portion when the second plug is inserted. Accordingly, bringing the first protruding portion of the O-ring into contact with the first plug with the short front end portion and bringing the second protruding portion of the O-ring into contact with the second plug with the long front end portion allows the socket to be compatible with plugs varying in length.

Moreover, in the socket of the present invention, in the inserted state, the increased-diameter portion of the plug is engaged with the first steel balls and the outer end portion of the inner support portion comes into contact with the first steel balls. Accordingly, in the inserted state in which large pressure acts on the insides of the plug and the socket, bringing both of the plug and the inner support portion into contact with the first steel balls reduces contraction of pressure and facilitates the turning of the outer support portion.

Moreover, the pipe connector of the present invention includes the socket described above; and the plug configured to be inserted into the socket. Accordingly, one socket is compatible with multiple types of plugs and capital expenditure for a plant using the pipe connector can be reduced.

BRIEF DESCRIPTION OF THE DRAWINGS

FIGS. 2A and 2B are views illustrating the socket of the present invention.

FIGS. 3A to 3D are views illustrating an outer support portion forming a pipe connector of the present invention.

FIGS. 5A to 5D are cross-sectional views illustrating a configuration and functions of an O-ring included in the socket of the present invention.

FIGS. 6A to 6C are views illustrating a situation in which the plug having the short front end portion is inserted into the socket of the present invention.

FIGS. 7A to 7C are views illustrating a situation in which the plug having the front end portion with the intermediate length is inserted into the socket of the present invention.

FIGS. 8A to 8C are views illustrating a situation in which the plug having the long front end portion is inserted into the socket of the present invention.

MODES FOR CARRYING OUT THE INVENTION

Figure 1:
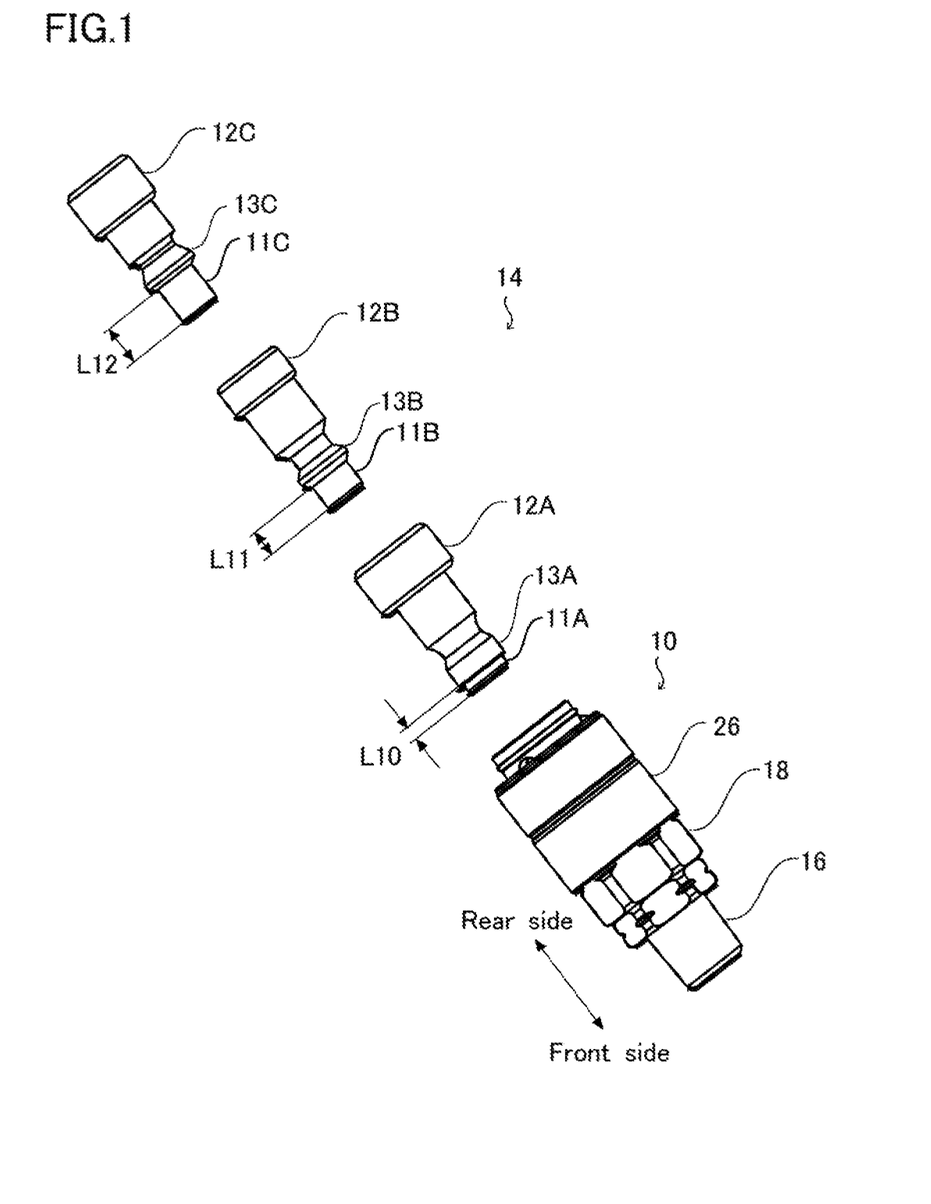
FIG. 1 is a perspective view illustrating a socket of the present invention and a plug insertable into the socket.

A configuration of a pipe connector 14 according to an embodiment is described with reference to FIG. 1. The pipe connector 14 of the embodiment includes a socket 10 and plugs 12A, 12B, 12C configured to be inserted into the socket 10 and is formed by inserting any of the plugs 12A, 12B, 12C into the socket 10. In the following description, the plugs 12A, 12B, 12C are sometimes collectively referred to as plug 12, front end portions 11A, 11B, 11C are sometimes collectively referred to as front end portion 11, and increased-diameter portions 13A, 13B, 13C are sometimes collectively referred to as increased-diameter portion 13. In this description, the plug 12A is a first plug and the plug 12B or the plug 12C is a second plug.

A role of the pipe connector 14 is to enable coupling and uncoupling of a hose connecting a compressed air generation device such as a compressor and a compressed air usage device such as a nail gun to each other by being installed on the hose. In usage, the compressed air flows from the socket 10 toward the plug 12. In this description, the plug 12 is sometimes referred to as a male joint member and the socket 10 is sometimes referred to as a female joint member. Moreover, in the following description, the upstream side in a flow of compressed fluid is referred to as front and the downstream side in this flow is referred to as rear. Furthermore, in the following description, the outer side and the inner side in a radial direction are sometimes simply referred to as outer side and inner side. Moreover, both of gas such as air and liquid such as water can be employed as the fluid flowing through the pipe connector.

States of the pipe connector 14 include an inserted state in which the plug 12 is inserted in the socket 10 and the plug 12 and the socket 10 are in a communicating airtight state, a semi-inserted state in which the plug 12 is inserted in the socket 10 and the socket 10 and the plug 12 are in a non-communicating airtight state, and a non-inserted state in which the plug 12 is pulled out from the socket 10. FIG. 1 illustrates the non-inserted state in which the plug 12 is pulled out from the socket 10. The semi-inserted state is also referred to as purge.

Although described in detail later, a method of transitioning the pipe connector 14 from the non-inserted state to the inserted state is as follows. The pipe connector 14 is set to the inserted state by inserting the plug 12 into the socket 10 and engaging the increased-diameter portion 13 of the plug 12 with first steel balls 22 which are arranged on the front side in the socket 10 and which are not illustrated in FIG. 1.

The method of transitioning the pipe connector 14 from the inserted state to the non-inserted state is as follows. When an outer support portion 26 is turned clockwise at a predetermined angle as viewed from the front end side with a base portion 18 of the socket 10 fixed in the inserted state, the increased-diameter portion 13 of the plug 12 is disengaged from the not-illustrated first steel balls 22 on the front end side which are built in the socket 10 and is engaged with not-illustrated second steel balls 24 on the rear end side. The semi-inserted state is thereby achieved in which the communicating air-tight state is canceled with the state where the plug 12 is inserted in the socket 10 maintained. Thereafter, the outer support portion 26 is moved toward the front end with the base portion 18 fixed. This causes the increased-diameter portion 13 of the plug 12 to be disengaged from the second steel balls 24 of the socket 10 and the non-inserted state is achieved by pulling the plug 12 out from the socket 10.

In the embodiment, the socket 10 is compatible with the multiple plugs 12A, 12B, 12C varying in shape. In the plugs 12A, 12B, 12C, the length of the front end portion 11A is the smallest followed by the lengths of the front end portions 11B, 11C. Specifically, a relationship of L10<L11<L12 is established, where L10 is the length, in an axial direction, of the front end portion 11A formed at the front end of the plug 12A, L11 is the length of the front end portion 11B of the plug 12B, and L12 is the length of the front end portion 11C of the plug 12C. Moreover, the increased-diameter portion 13A is formed by causing an intermediate portion of the plug 12A to protrude toward the outer side in the radial direction, the increased-diameter portion 13B is formed by causing an intermediate portion of the plug 12B to protrude toward the outer side in the radial direction, and the increased-diameter portion 13C is formed by causing an intermediate portion of the plug 12C to protrude toward the outer side in the radial direction.

In the embodiment, one socket 10 is compatible with the multiple plugs 12 having the front end portions 11 varying in length. Accordingly, for example, when multiple types of plugs 12 varying in shape are used in a manufacturing plant, the compressed air can be supplied to the plugs 12A, 12B, 12C from one type of socket 10. Thus, there is no need to prepare the socket 10 for each type of plug 12A and capital expenditure for the plant can be reduced. In other words, the compatibility of the socket 10 can be improved.

Figure 2A:
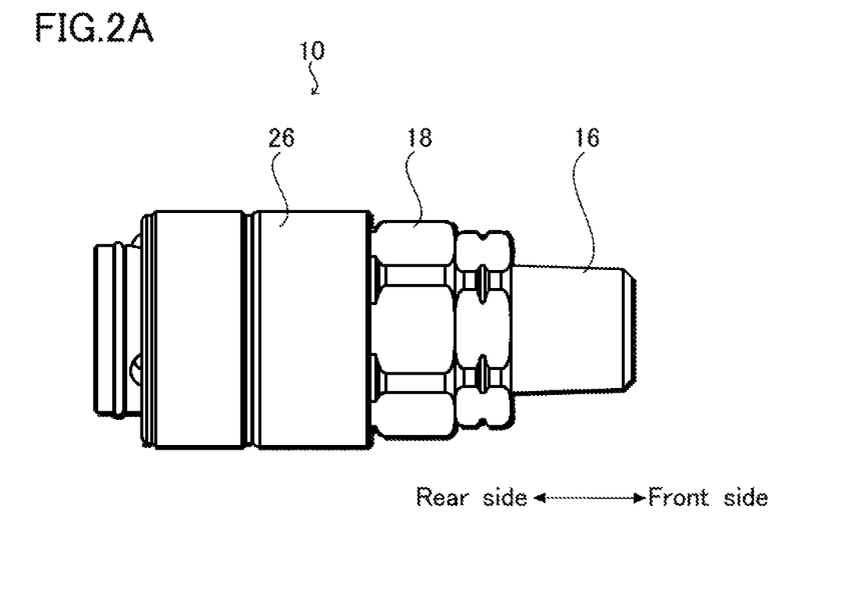
FIG. 2A is a plan view illustrating the socket.

A configuration of the socket 10 in the non-inserted state is described with reference to FIGS. 2A and 2B. FIG. 2A is a plan view illustrating the socket 10 in the non-inserted state and FIG. 2B is a cross-sectional view in which the socket 10 illustrated in FIG. 2A is cut along an axis.

Referring to FIG. 2A, the socket 10 includes a front end base portion 16, the base portion 18, and the outer support portion 26 in this order from the front side. The front end base portion 16 side is connected to, for example, a compressor via a hose or the like and the aforementioned plug 12A or the like is connected to a rear end section of the base portion 18. When the user uses the socket 10, the user holds the front end base portion 16 and the base portion 18 in place in a turning direction with one hand and turns the outer support portion 26 with the other hand. The socket 10 is thereby transitioned from the inserted state to the semi-inserted state. Then, the user holds the front end base portion 16 and the base portion 18 in place in an axial direction with one hand and moves the outer support portion 26 forward with the other hand. The socket 10 is thereby transitioned from the semi-inserted state to the non-inserted state.

Figure 2B:
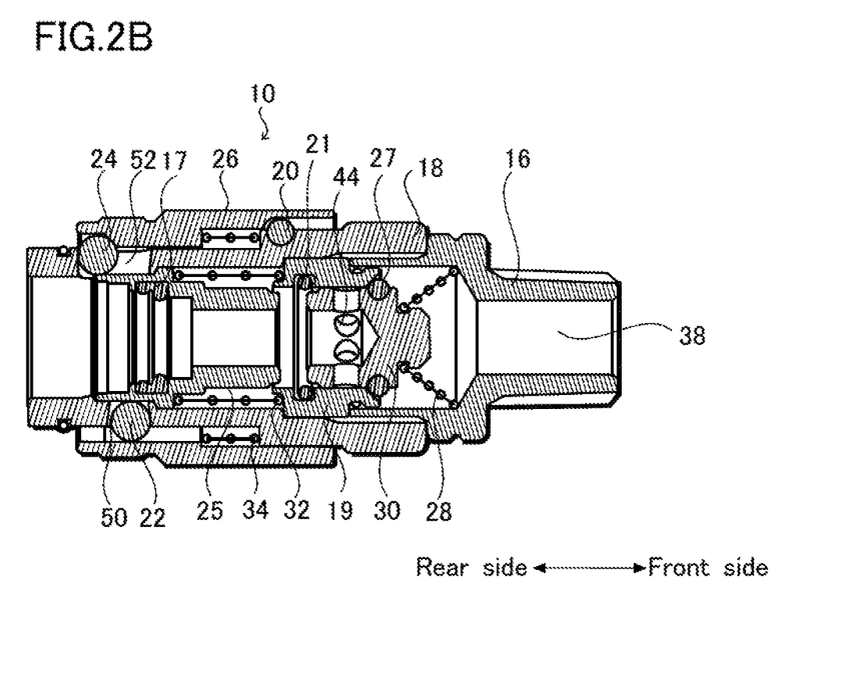
FIG. 2B is a cross-sectional view.

Referring to FIG. 2B, the socket 10 mainly includes, the cylindrical base portion 18, the cylindrical front end base portion 16 inserted into the base portion 18 from the front side, a substantially-annular partition wall portion 19 built in the base portion 18, a valve element 30 configured to block a fluid flow passage by coming into contact with the partition wall portion 19, the first steel balls 22 and the second steel balls 24 housed in housing holes penetrating the base portion 18, an inner support portion 25 coaxially provided inside the base portion 18 and supporting the first steel balls 22 and the second steel balls 24 from the inner side, and the outer support portion 26 coaxially provided outside the base portion 18 and supporting the first steel balls 22 and the second steel balls 24 from the outer side. These members are made of metal such as stainless steel.

The base portion 18 is formed of a cylindrical metal member open on both ends. The inner diameter of the base portion 18 is slightly larger than the outer diameter of the plug 12. Multiple first housing holes 50 and second housing holes 52 penetrating the base portion 18 in a thickness direction are provided in a rear end portion of the base portion 18 to be arranged in the circumferential direction. The spherical first steel balls 22 and second steel balls 24 made of metal are housed in the first housing holes 50 and the second housing holes 52. In this description, the steel balls are sometimes referred to as lock balls.

The front end base portion 16 is formed of a cylindrical metal member open on both ends and is connected to the base portion 18 by being partially inserted in the front end portion of the base portion 18. The connection of the front end base portion 16 and the base portion 18 is achieved by screwing, bonding, or a combination of these. This connection structure also applies to other members which involve inserting. In this description, the front end base portion 16 can be considered as part of the base portion 18.

The partition wall portion 19 is a ring-shaped member coming into internal contact with the base portion 18 and has a role of maintaining the air-tightness of the fluid flow passage in the socket 10 together with the valve element 30 in usage. The position of the partition wall portion 19 inside the base portion 18 is determined by bringing an end portion of the front end base portion 16 on the rear end side into contact with the partition wall portion 19.

The valve element 30 has a bottomed cylindrical shape with an opening on the rear end side and is built in the base portion 18 such that an outer surface of the valve element 30 comes into contact with an inner surface of the partition wall portion 19. Moreover, multiple hole portions 44 penetrating a side wall of the valve element 30 are provided at equal intervals in the circumferential direction. A fluid flow passage in the plug 12 communicates with a fluid flow passage in the socket 10 via these hole portions 44. Moreover, a spring 28 (first biasing unit) is provided between the valve element 30 and an inner wall of the front end base portion 16 and generates biasing force which moves the valve element 30 toward the rear end. An outer peripheral side surface of the valve element 30 is depressed toward the inner side in a portion where the hole portions 44 are formed and this shape facilitates flowing of the fluid via the hole portions 44.

The inner support portion 25 is a substantially-ring shaped metal member coaxially built in the base portion 18 and has a role of supporting the first steel balls 22 and the second steel balls 24, housed in the housing holes of the base portion 18, from the inner side. A spring 32 (second biasing unit) is arranged between the inner support portion 25 and the partition wall portion 19 and generates biasing force which moves the inner support portion 25 toward the rear end. In the non-inserted state illustrated in FIGS. 2A and 2B, the first steel balls 22 and the second steel balls 24 are supported by the inner support portion 25 from the inner side.

The outer support portion 26 is a ring-shaped metal member coaxially covering the base portion 18 from the outer side and has a role of supporting the first steel balls 22 and the second steel balls 24 housed in the base portion 18 from the outer side. A spring 34 (third biasing unit) is arranged between the base portion 18 and the outer support portion 26 and generates biasing force which moves the outer support portion 26 toward the rear end with respect to the base portion 18. Furthermore, the spring 34 also generates biasing force which turns the outer support portion 26 counterclockwise with respect to the base portion 18 when the socket 10 is viewed from the front side. In this description, the outer support portion 26 is sometimes referred to as sleeve.

Moreover, a steel ball 20 for restricting movement of the outer support portion 26 relative to the base portion 18 is arranged between the base portion 18 and an end portion of the outer support portion 26 on the front end side. A not-illustrated groove with a semi-spherical cross section is provided in the base portion 18 to house the steel ball 20 and an L-shaped groove portion 56 (FIG. 3A) for movement restriction is provided on an inner surface of the outer support portion 26.

In the embodiment, the first housing holes 50 and the second housing holes 52 are formed to penetrate portions of a rear section of the inner support portion 25. The second housing holes 52 are formed to be longer than the first housing holes 50 in a front-rear direction. The first steel balls 22 are housed in the first housing holes 50 and the second steel balls 24 are housed in the second housing holes 52. As described later, the first steel balls 22 fix the increased-diameter portion 13A and the like of the plug 12A and the like at a certain position in the inserted state and the second steel balls 24 fix the increased-diameter portion 13A and the like in the plug 12A and the like at a certain position in the semi-inserted state.

Moreover, an O-ring 27 and the like made of synthetic resin and used to maintain air-tightness are arranged in appropriate portions of the socket 10. Specifically, the O-ring 27 is arranged on an outer peripheral surface of the valve element 30 and a pipe passage on the front side of the valve element 30 can be blocked by causing the O-ring 27 to be held between the valve element 30 and the partition wall portion 19. Moreover, an O-ring 21 is arranged inside the partition wall portion 19 and contact of the O-ring 21 with an outer side surface of the plug 12B or the like inserted as described later isolates a contact portion between the valve element 30 and the plug 12 from the outside.

Furthermore, an O-ring 17 is arranged inside the inner support portion 25 and, as described later, comes into contact with an end surface and a side surface of the inserted plug 12. Air tightness between the socket 10 and the plug 12 or the like is maintained by contact of the O-ring 17 with the plug 12A or the like. The O-ring 17 has such a shape that preferable contact with the plug 12A and the like having front ends varying in shape is possible and such matters are described later. The O-ring 17 maintains air-tightness by coming into contact with the plug 12A or the like while being compressed in the axial direction or the radial direction.

Figure 3A:
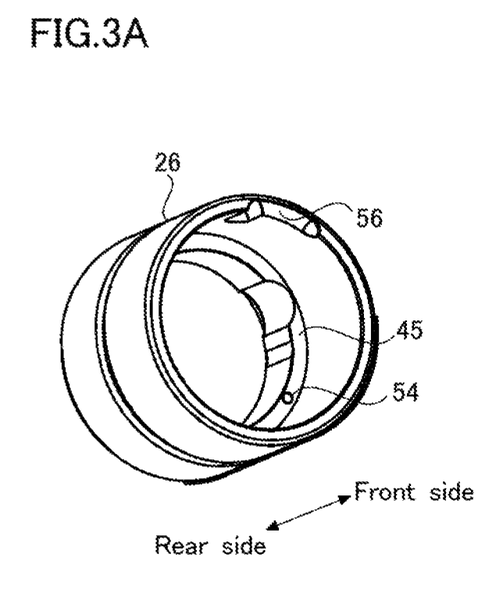
FIG. 3A is a perspective view illustrating the outer support portion.

A configuration of the outer support portion 26 forming the aforementioned socket 10 is described with reference to FIGS. 3A to 3D. FIG. 3A is a perspective view illustrating the outer support portion 26, FIG. 3B is a cross-sectional view in which the outer support portion 26 is cut along the axial direction, FIG. 3C is a cross-sectional view in which the outer support portion 26 is cut in the circumferential direction, and FIG. 3D is a cross-sectional view in which the outer support portion 26 is cut along the same cross section as that of FIG. 3C after being turned.

Figure 3B:
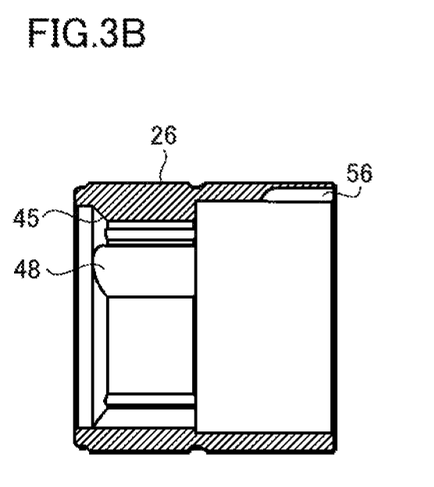
FIG. 3B is a cross-sectional view taken along an axial direction of the outer support portion.

Referring to FIGS. 3A and 3B, the outer support portion 26 has a substantially-ring shape and is provided with an annular protruding portion 45 formed by causing an inner wall of the outer support portion 26 to protrude toward the inner side in an annular protrusion shape. The length at which the annular protruding portion 45 protrudes toward the inner side is about such a length that the first steel balls 22 pressed by the annular protruding portion 45 can be engaged with the increased-diameter portion 13 of the plug 12.

Figure 3C:
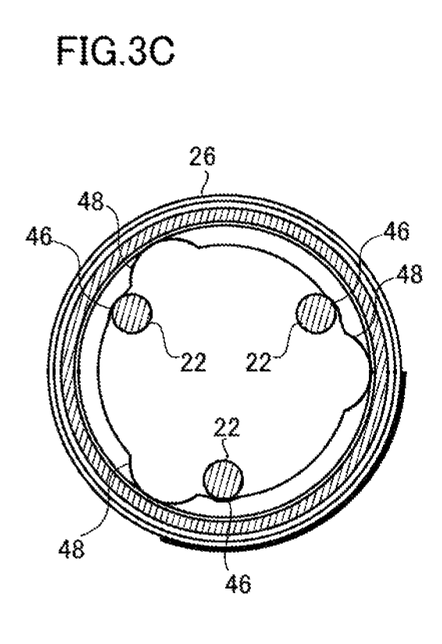
FIGS. 3C and 3D are cross-sectional views taken along a circumferential direction.

With reference to FIG. 3C, multiple grooves are provided to extend in the axial direction by partially depressing an inner surface of the annular protruding portion 45 toward the outer side. Specifically, first grooves 46 which are relatively shallow and second grooves 48 which are deeper than the first grooves 46 are provided. For example, three first grooves 46 are provided at equal intervals in the circumferential direction in portions corresponding to the first steel balls 22. For example, three second grooves 48 are provided at equal intervals in the circumferential direction in portions corresponding to the first steel balls 22, at positions between the adjacent first grooves 46. The first grooves 46 and the second grooves 48 are adjacent to one another in the circumferential direction. The first grooves 46 are portions to which the first steel balls 22 are fitted in the inserted state to be described later. The positions of the base portion 18 and the outer support portion 26 in the turning direction are thereby fixed in the inserted state and the case where the outer support portion 26 is turned at an inappropriate timing and the inserted state is canceled is prevented.

Figure 3D:
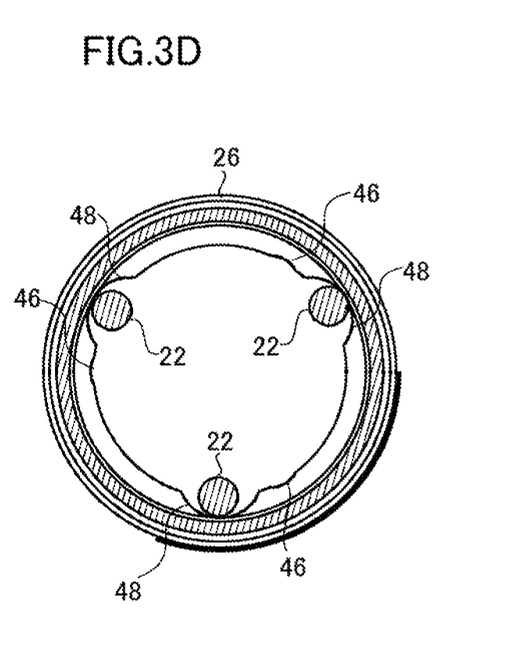

With reference to FIG. 3D, when the outer support portion 26 is turned in the inserted state, the first steel balls 22 move out from the first grooves 46 and are then housed in the deeper second grooves 48 to move toward the outer side in the radial direction. The increased-diameter portion 13A or the like of the plug 12A or the like is thus disengaged from the first steel balls 22. The increased-diameter portion 13 is engaged with the second steel balls 24 on the rear end side as described later and the pipe connector 14 is set to the semi-inserted state.

Moreover, referring to FIG. 3A, the groove portion 56 formed by depressing the inner surface of the end portion of the outer support portion 26 on the front end side in an L shape is provided. Fitting the steel ball 20 illustrated in FIG. 2B to the groove portion 56 restricts the positions of the base portion 18 and the outer support portion 26 relative to each other in the axial direction and the turning direction.

Figure 4:
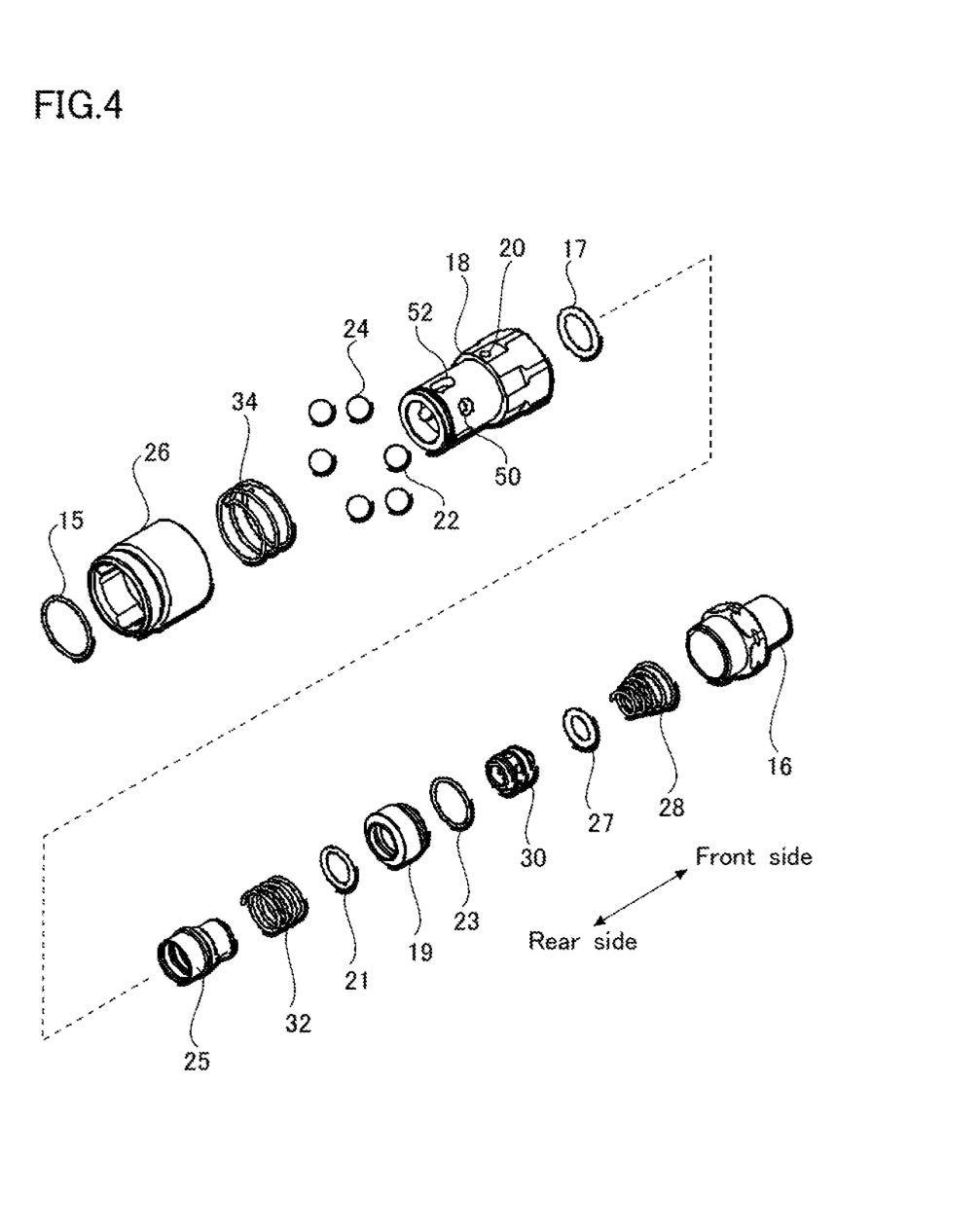
FIG. 4 is an exploded perspective view illustrating the socket of the present invention.

The housing holes provided in the base portion 18 and correlations among the base portion 18, the spring 34, and the outer support portion 26 are described with reference to FIG. 4.

As described above, the base portion 18, the spring 34, and the outer support portion 26 are coaxially arranged in this order from the inner side. In a state where the spring 34 is compressed in the axial direction, an end portion of the spring 34 on the rear end side is in contact with a step portion provided on the inner surface of the outer support portion 26 and an end portion of the spring 34 on the front end side is in contact with another step portion provided on the outer surface of the base portion 18.

The multiple first housing holes 50 and second housing holes 52 are provided to penetrate the base portion 18 in circular shapes. The first housing holes 50 are holes housing the first steel balls 22 with which the increased-diameter portion 13 of the plug 12 is engaged in the state where the plug 12 is inserted into the socket 10 and are provided to penetrate the base portion 18 in a circular shape. The first housing holes 50 are arranged at equal intervals in the circumferential direction, at the same position in the axial direction of the base portion 18. In this example, three first housing holes 50 are formed in the base portion 18.

The second housing holes 52 are provided to penetrate the base portion 18 and are longer than the first housing holes 50 in the axial direction. The second housing holes 52 are holes housing the second steel balls 24 to which the increased-diameter portion 13 of the plug 12 is engaged in the semi-inserted state. In this example, three second housing holes 52 are formed in the base portion 18. Front end portions of the second housing holes 52 are located at the same position as front end portions of the first housing holes 50 in the axial direction. Meanwhile, rear end portions of the second housing holes 52 are located behind rear end portions of the first housing holes 50. This allows the second steel balls 24 housed in the second housing holes 52 to move in the axial direction.

When the first housing holes 50 and the second housing holes 52 are viewed in the axial direction, each second housing hole 52 is arranged in a substantially center portion of an area between the adjacent first housing holes 50. The sufficient distance between the first housing holes 50 and the second housing holes 52 are thereby provided.

The end portion of the spring 34 on the rear end side is inserted in a hole portion 54 (FIG. 3A) provided on the inner surface of the outer support portion 26. The spring 34 and the outer support portion 26 are thereby fixed in the turning direction. Moreover, the front end portion of the spring 34 is inserted into a not-illustrated hole portion provided in the step portion of the base portion 18. Inserting both end portions of the spring 34 into the hole portion in the outer support portion 26 and the not-illustrated hole portion in the base portion 18 causes the outer support portion 26 to be incorporated in the base portion 18 while being biased in the turning direction.

Moreover, about a half of the steel ball 20 is buried in the base portion 18. This steel ball 20 is fitted to the L-shaped groove portion 56 provided in the outer support portion 26 illustrated in FIG. 3A. Amounts of movement of the outer support portion 26 in the axial direction and the turning direction are thereby restricted.

A stop ring 15 determining the position of the front end of the outer support portion 26 is fitted to an end portion of the base portion 18. Moreover, an O-ring 23 arranged between the partition wall portion 19 and the valve element 30 is held between the partition wall portion 19 and the valve element 30 to maintain air-tightness in a gap therebetween.

Figure 5A:
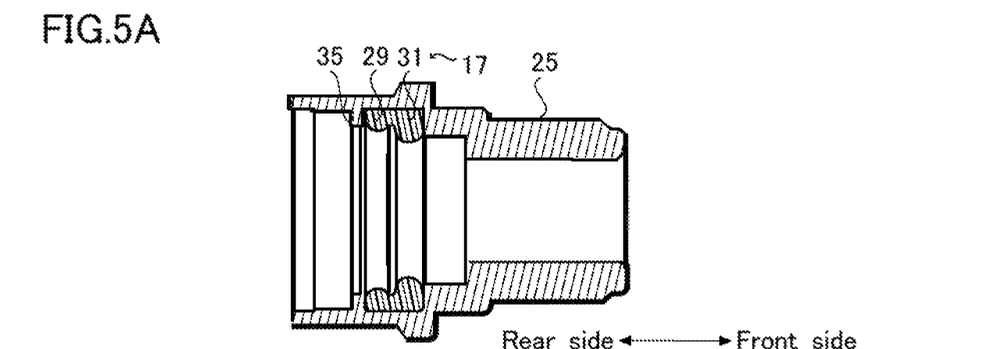
FIG. 5A is a cross-sectional view in which an inner support portion including the O-ring is cut along the axial direction.

Configurations of the inner support portion 25 and the O-ring 17 are described with reference to FIGS. 5A to 5D. FIG. 5A is a cross-sectional view of the inner support portion 25 cut along the axial direction, FIG. 5B is a cross-sectional view illustrating the inner support portion 25 in which the plug 12A is inserted, FIG. 5C is a cross-sectional view illustrating the inner support portion 25 in which the plug 12B is inserted, and FIG. 5D is a cross-sectional view illustrating the inner support portion 25 in which the plug 12C is inserted.

Referring to FIG. 5A, the O-ring 17 is arranged on an inner wall of an intermediate portion of the inner support portion 25. The O-ring 17 includes a first protruding portion 29 protruding toward the inner side in the radial direction and a second protruding portion 31 protruding toward the inner side more than the first protruding portion 29. The first protruding portion 29 and the second protruding portion 31 are formed of an integral member made of resin material such as rubber but may be formed as separate bodies.

Moreover, the O-ring 17 is housed in a groove region formed by depressing the inner wall of the inner support portion 25 toward the outer side. An inner side surface of the O-ring 17 has a step shape and the air-tightness of the fluid passage formed by the plug 12A and the socket 10 can be maintained by the contact of the O-ring 17 having such a shape with the inserted plug 12A or the like. Moreover, in the insertion, a step portion formed just behind the front end portion 11A of the plug 12A or the like comes into contact with a step portion 35 formed by causing a portion of the inner support portion 25 just behind the O-ring 17 to protrude toward the inner side.

Figure 5B:
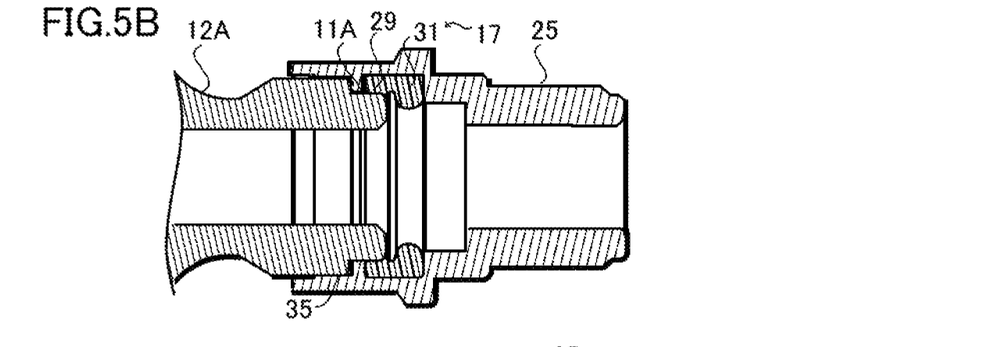
FIG. 5B is a cross-sectional view of the O-ring and the inner support portion in the case where a plug having a short front end portion is inserted.
Figure 5C:
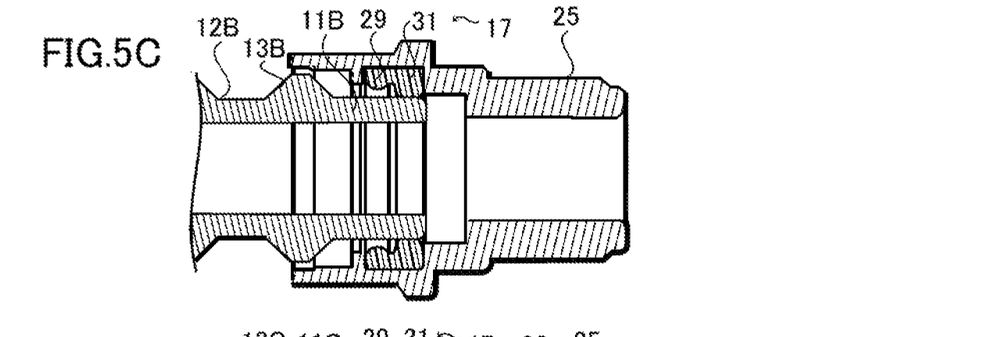
FIG. 5C is a cross-sectional view of the O-ring and the inner support portion in the case where a plug having a front end portion with an intermediate length is inserted.
Figure 5D:
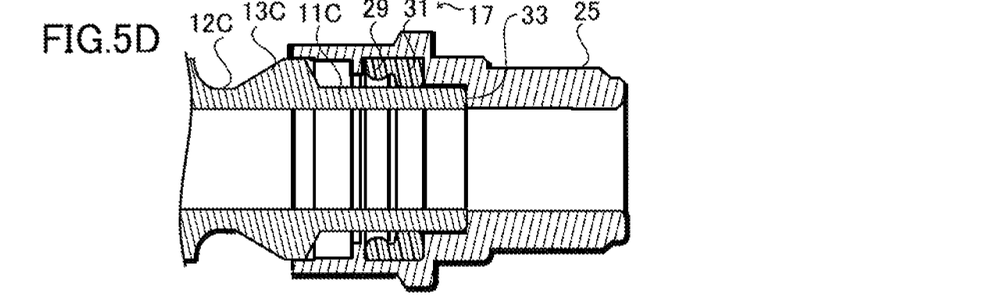
FIG. 5D is a cross-sectional view of the O-ring and the inner support portion in the case where a plug having a long front end portion is inserted.

Referring to FIG. 5B, when the plug 12A is inserted into the inner support portion 25, a front end surface of the front end portion 11A of the plug 12A comes into contact with a rear side surface of the second protruding portion 31 of the O-ring 17. Moreover, an outer side surface of the front end portion 11A comes into contact with an inner side surface of the first protruding portion 29 of the O-ring 17. The air-tightness in the case where the plug 12A is in the inserted state can be thereby maintained. Moreover, in the inserted state, the plug 12A is slightly pushed backward by pressure and the front side surface of the front end portion 11A of the plug 12A is spaced away from the rear side surface of the second protruding portion 31 of the O-ring 17.

Referring to FIG. 5C, when the plug 12B is inserted into the inner support portion 25, an outer side surface of the front end portion 11B of the plug 12B comes into contact with an inner side surface of the second protruding portion 31 of the O-ring 17. The air-tightness in the case where the plug 12A is in the inserted state can be thereby maintained. Note that, in this case, the front end portion 11B of the plug 12B is out of contact with the first protruding portion 29 of the O-ring 17.

Referring to FIG. 5D, when the plug 12C is inserted into the inner support portion 25, an outer side surface of the front end portion 11C of the plug 12C comes into contact with the inner side surface of the second protruding portion 31 of the O-ring 17. The air-tightness in the case where the plug 12A is in the inserted state can be thereby maintained. Note that, also in this case, the front end portion 11C of the plug 12B is out of contact with the first protruding portion 29 of the O-ring 17. Moreover, the plug 12C is inserted into the inner support portion 25 more deeply than the plug 12B. Furthermore, when inserted, the front end portion 11C of the plug 12B is in contact with a step portion 33 of the inner support portion 25.

Figure 6A:
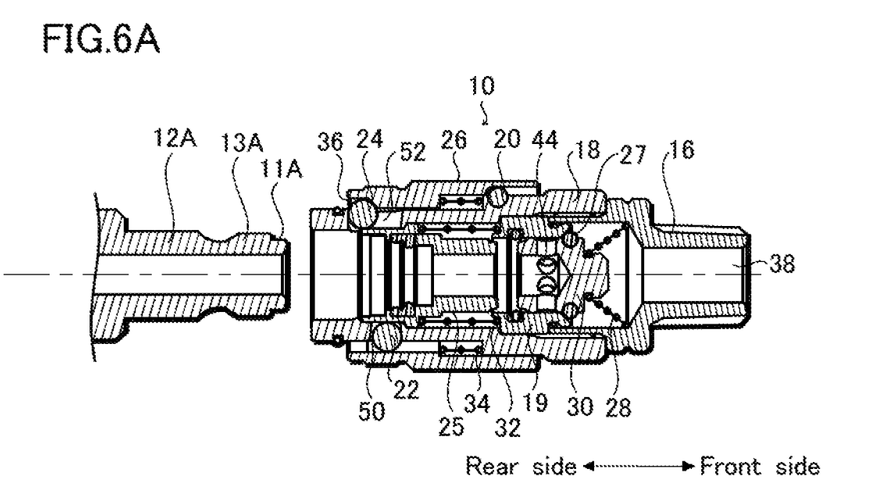
FIG. 6A is a cross-sectional view of the socket and the plug in a non-inserted state.
Figure 6B:
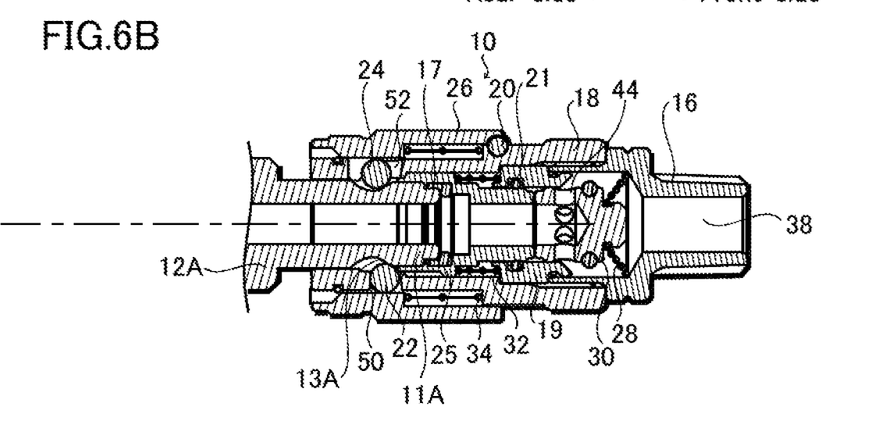
FIG. 6B is a cross-sectional view of the socket and the plug in an inserted state.
Figure 6C:
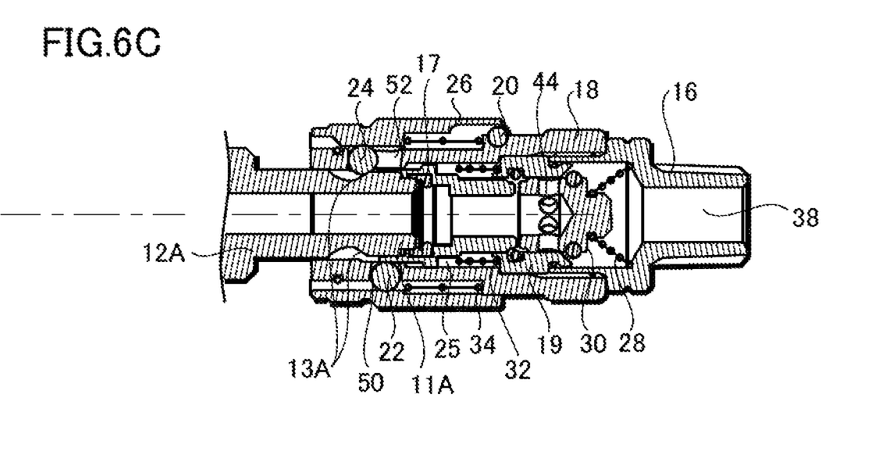
FIG. 6C is a cross-sectional view of the socket and the plug in a semi-inserted state.

FIGS. 6A to 6C are views illustrating a situation in which the plug 12A having the short front end portion 11A is inserted into the socket 10. FIG. 6A is a cross-sectional view of the socket 10 and the plug 12A in the non-inserted state, FIG. 6B is a cross-sectional view of the socket 10 and the plug 12A in the inserted state, and FIG. 6C is a cross-sectional view of the socket 10 and the plug 12A in the semi-inserted state.

Referring to FIG. 6A, in the non-inserted state in which the plug 12A is not inserted in the socket 10, inside the socket 10, the valve element 30 biased by the spring 28 is pressed against the partition wall portion 19 and the O-ring 27 is thereby pressed against the partition wall portion 19 and the valve element 30. The air-tightness of the pipe passage upstream of the valve element 30 is thereby maintained.

Referring to FIG. 6B, when the plug 12A is inserted into the socket 10, the second steel balls 24 are moved toward the inner side and stop supporting the outer support portion 26 on the rear side thereof. As a result, the outer support portion 26 is moved rearward with respect to the base portion 18 by the pressing force of the spring 34. Furthermore, as described with reference to FIG. 3C, since the outer support portion 26 turns with respect to the base portion 18, the first steel balls 22 move into the first grooves 46 of the outer support portion 26 and are thereby pushed toward the inner side. The pushed first steel balls 22 are engaged with the increased-diameter portion 13A of the plug 12A from the rear side and the state where the plug 12A is inserted in the socket 10 is thereby maintained. Moreover, inside the socket 10, the plug 12A moves the inner support portion 25 forward and the inner support portion 25 moves the valve element 30 forward. This cancels the airtight state between the valve element 30 and the partition wall portion 19. Accordingly, the pipe passage upstream of the valve element 30 communicates with the pipe passage downstream of the valve element 30 via the hole portions 44 of the valve element 30. In this state, the compressed fluid such as compressed air can flow through the pipe connector 14 formed of the socket 10 and the plug 12A. In this state, a front outer side surface of the inner support portion 25 is in contact with the O-ring 21 arranged inside the partition wall portion 19 and the air-tightness in the portion where the front end of the inner support portion 25 and the rear end of the valve element 30 come into contact with each other is thereby maintained.

Moreover, referring to FIG. 5B, when the plug 12A is inserted into the socket 10, the front end surface of the plug 12A presses the rear side surface of the second protruding portion 31 of the O-ring 17.

Moreover, in this inserted state, the second steel balls 24 housed in the second housing holes 52 are not engaged with the increased-diameter portion of the plug 12A. However, since the second housing holes 52 are formed to be elongated in the front-rear direction, the second steel balls 24 are allowed to move relatively freely in the second housing holes 52 and do not hinder the insertion operation of the plug 12A.

Furthermore, in the inserted state, as described above with reference to FIG. 5B, the front end surface of the front end portion 11A of the plug 12A is in contact with the rear side surface of the second protruding portion 31 of the O-ring 17 or the outer side surface of the front end portion 11A is in contact with the inner side surface of the first protruding portion 29 of the O-ring 17. The plug 12A with the short front end portion 11A can be thereby inserted into the socket 10 with the air-tightness maintained.

Furthermore, in the inserted state, the rear end of the inner support portion 25 is in contact with the first steel balls 22. The stress applied from the plug 12A to the first steel balls 22 is thereby reduced. Thus, in the transition from the inserted state to the non-inserted state, it is possible to easily turn the outer support portion 26 and disengage the increased-diameter portion 13A of the plug 12A from the first steel balls 22.

Referring to FIG. 6C, in the transition from the inserted state to the semi-inserted state, first, the base portion 18 is held in place in the turning direction and then the outer support portion 26 is turned. As illustrated in FIG. 3D, this causes the first steel balls 22 to move into the deep second grooves 48 in the inner support portion 25 and move toward the outer side and the increased-diameter portion 13A of the plug 12A is thereby disengaged from the first steel balls 22. As a result, the plug 12A moves rearward. Meanwhile, since the second steel balls 24 are kept being pressed toward the inner side by the outer support portion 26, the second steel balls 24 are engaged with the increased-diameter portion 13A of the plug 12A behind the position in FIG. 6B and the plug 12A is fixed at this position to be set to the semi-inserted state. In this case, the second steel balls 24 are moved to the rear ends of the second housing holes 52.

In the semi-inserted state, inside the socket 10, the valve element 30 biased by the spring 28 is pushed toward the partition wall portion 19 and the O-ring 27 is thereby pressed against the partition wall portion 19 and the valve element 30. The air-tightness of the pipe passage upstream of the valve element 30 is thereby secured. Moreover, the portion where the front end of the inner support portion 25 and the rear end of the valve element 30 come into contact with each other is in the same portion as the O-ring 21 in the axial direction. Moreover, a gap is formed between the front end of the inner support portion 25 and the rear end of the valve element 30. Accordingly, it is possible to release the compressed air present in the pipe passage downstream of the inner support portion 25 to the outside via this gap and prevent the plug 12A from jumping out when the air-tightness between the front end of the inner support portion 25 and the rear end of the valve element 30 is broken.

Moving the outer support portion 26 forward while holding the base portion 18 in place in the axial direction in the semi-inserted state causes the second steel balls 24 to be housed in grooves 36 and move toward the outer side as illustrated in FIG. 6A and the increased-diameter portion 13A of the plug 12A is thereby disengaged from the second steel balls 24. Pull-out of the plug 12A from the socket 10 is thus made possible.

Moreover, in this case, the rear end of the inner support portion 25 biased by the spring 34 comes into contact with the second steel balls 24 moved inside the second housing holes 52 to the rear end thereof and the position of the inner support portion 25 in the front-rear direction is thereby restricted.

Figure 7A:
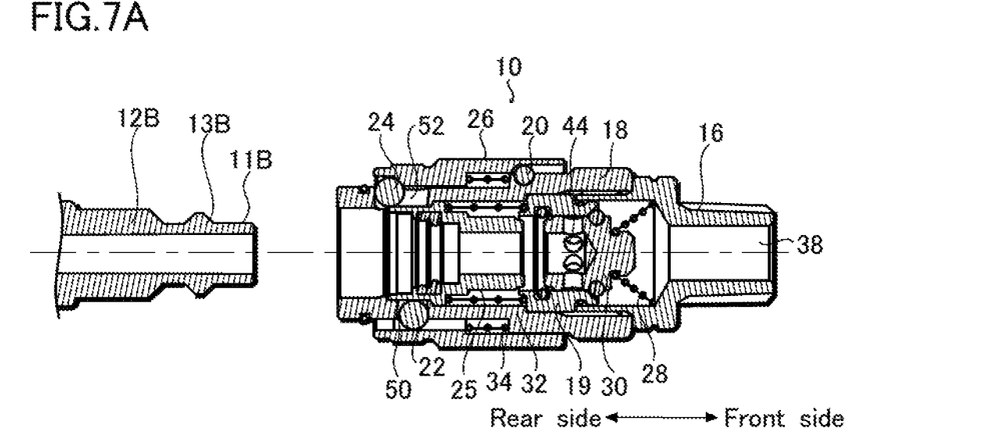
FIG. 7A is a cross-sectional view of the socket and the plug in the non-inserted state.

A method of inserting the plug 12B having the front end portion 11B with an intermediate length into the socket 10 is described with reference to FIGS. 7A to 7C. FIG. 7A is a cross-sectional view of the socket 10 and the plug 12B in the non-inserted state, FIG. 7B is a cross-sectional view of the socket 10 and the plug 12B in the inserted state, and FIG. 7C is a cross-sectional view of the socket 10 and the plug 12B in the semi-inserted state.

The structure of the socket 10 in the non-inserted state illustrated in FIG. 7A is the same as that illustrated in FIG. 6A.

Figure 7B:
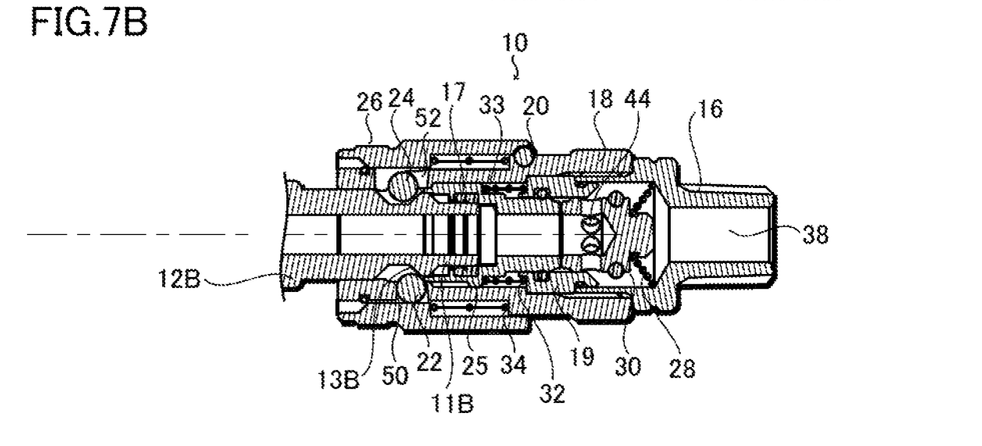
FIG. 7B is a cross-sectional view of the socket and the plug in the inserted state.
Figure 7C:
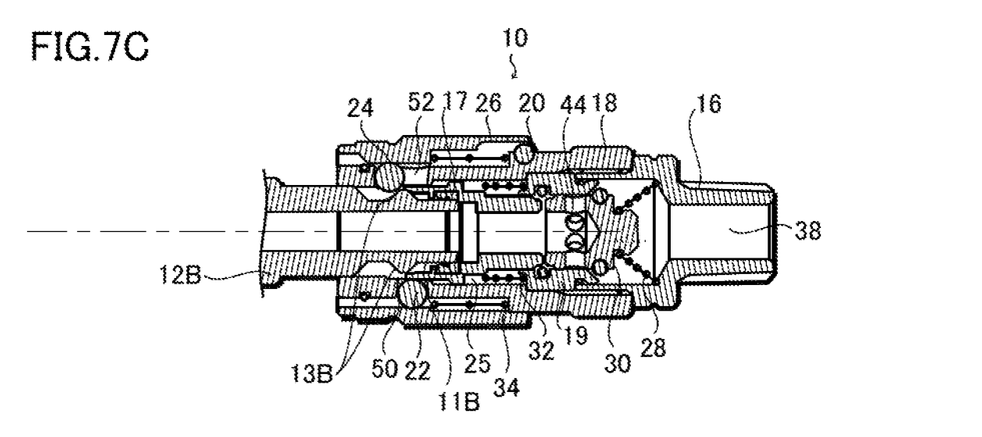
FIG. 7C is a cross-sectional view of the socket and the plug in the semi-inserted state.

Referring to FIG. 7B, when the plug 12B is inserted into the socket 10, the inner support portion 25 moves forward by being pushed by the front end portion 11B of the plug 12B. Although the front end portion 11B of the plug 12B is away from the step portion 33 of the inner support portion 25 in FIG. 7B, the front end surface of the front end portion 11B of the plug 12B is in contact with the step portion 33 of the inner support portion 25 at the stage where the plug 12B is inserted into the socket 10.

When the plug 12B is fully inserted into the socket 10 and the increased-diameter portion 13B of the plug 12B is thereby engaged with the first steel balls 22, the plug 12B is slightly pushed back rearward by the pressure of the compressed fluid flowing inside the socket 10 and the plug 12B. The front end surface of the front end portion 11B of the plug 12B is thereby spaced away from the step portion 33 of the inner support portion 25.

When the plug 12B is in the inserted state, as described with reference to FIG. 5C, the outer peripheral side surface of the front end portion 11B of the plug 12B comes into contact with the inner side surface of the second protruding portion 31 of the O-ring 17 and the air-tightness is thereby secured. Moreover, the front end portion 11B of the plug 12B is longer than the front end portion 11A of the plug 12A described with reference to FIGS. 6A to 6C and the air-tightness between the plug 12A and the socket 10 is maintained by the contact of the front end portion 11A with a different portion of the O-ring 17.

Referring to FIG. 7C, an operation principle in pull-out of the plug 12B from the socket 10 is the same as that described with reference to FIG. 6C.

Figure 8A:
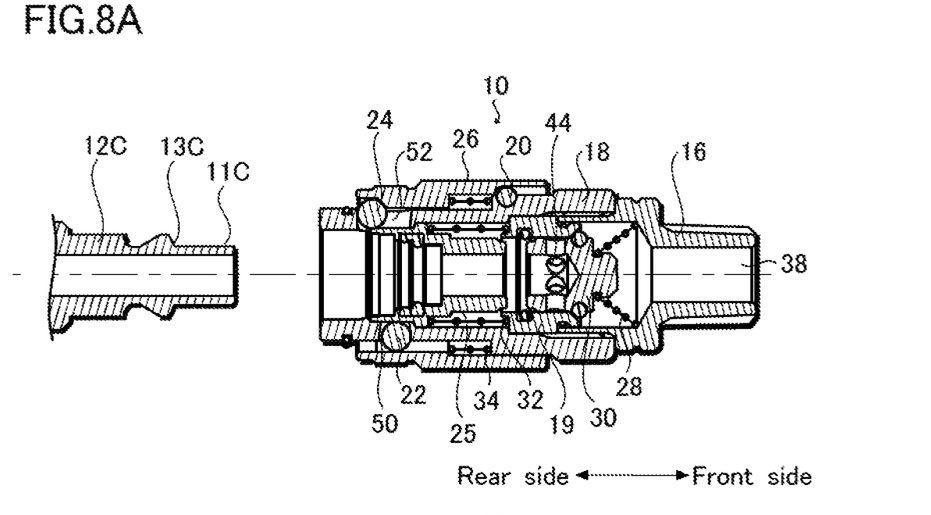
FIG. 8A is a cross-sectional view of the socket and the plug in the non-inserted state.

A situation of inserting the plug 12C having the long front end portion 11C into the socket 10 is described with reference to FIGS. 8A to 8C. FIG. 8A is a cross-sectional view of the socket 10 and the plug 12C in the non-inserted state, FIG. 8B is a cross-sectional view of the socket 10 and the plug 12C in the inserted state, and FIG. 8C is a cross-sectional view of the socket 10 and the plug 12C in the semi-inserted state.

The configuration of the socket 10 and the plug 12C in the non-inserted state illustrated in FIG. 8A is the same as that illustrated in FIG. 6A or 7A.

Figure 8B:
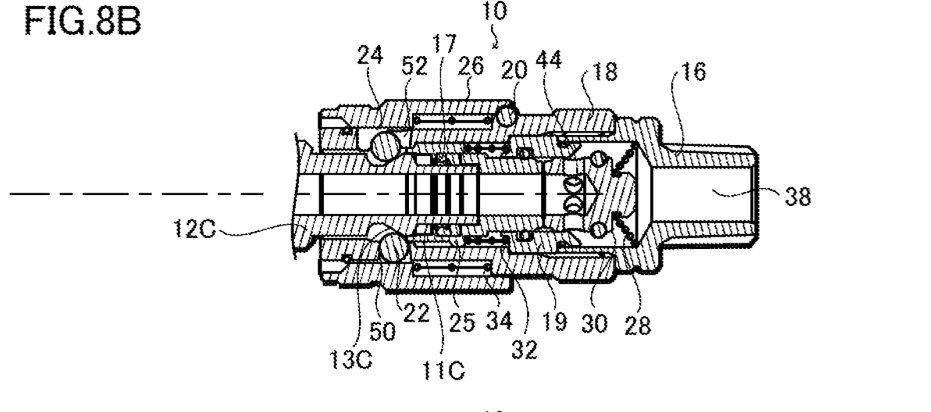
FIG. 8B is a cross-sectional view of the socket and the plug in the inserted state.

Referring to FIG. 8B, when the plug 12C is inserted into the socket 10, the valve element 30 is moved forward in the socket 10 and the airtight state maintained by the valve element 30 is canceled. Moreover, as illustrated in FIG. 5D, the outer peripheral portion of the long front end portion 11C of the plug 12C *comes* into contact with the inner side surface of the second protruding portion 31 of the O-ring 17 and the air-tightness in the contact portion between the front end of the inner support portion 25 and the rear end of the valve element 30 is thereby maintained. In this state, the increased-diameter portion 13C of the plug 12C is engaged with the first steel balls 22. The insertion length of the front end portion 11C of the plug 12C into the inner support portion 25 is longer than the insertion length of the front end portion 11B of the plug 12B into the inner support portion 25 illustrated in FIG. 7B.

Figure 8C:
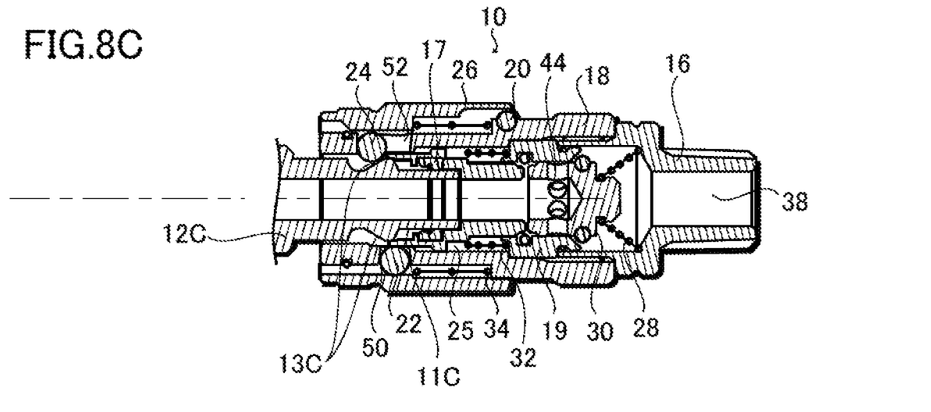
FIG. 8C is a cross-sectional view of the socket and the plug in the semi-inserted state.

Referring to FIG. 8C, an operation principle in pull-out of the plug 12C from the socket 10 is the same as that described with reference to FIG. 6C.

The present invention is not limited to the aforementioned embodiment and various other changes can be made within a scope not departing from the spirit of the present invention.

DESCRIPTION OF REFERENCE NUMERALS 10 socket
11, 11A, 11B, 11C front end portion
12, 12A, 12B, 12C plug
13, 13A, 13B, 13C increased-diameter portion
14 pipe connector
15 stop ring
16 front end base portion
17 O-ring
18 base portion
19 partition wall portion
20 steel ball
21 O-ring
22 first steel ball
23 O-ring
24 second steel ball
25 inner support portion
26 outer support portion
27 O-ring
28 spring
29 first protruding portion
30 valve element
31 second protruding portion
32 spring
33 step portion
34 spring
35 step portion
36 groove
44 hole portion
45 annular protruding portion
46 first groove
48 second groove
50 first housing hole
52 second housing hole
54 hole portion
56 groove portion

The invention claimed is:

1. A socket comprising:
a base portion having a substantially cylindrical shape;
a valve element housed in the base portion;
a plurality of first steel balls housed in first housing holes which are provided to penetrate the base portion;
a second steel ball housed in a second housing hole which penetrates the base portion and which is formed to be longer than the first housing holes in an axial direction;
a ring-shaped inner support portion supporting the first steel balls and the second steel ball from an inner side and being movable in the axial direction;
a ring-shaped outer support portion supporting the first steel balls and the second steel ball from an outer side and being movable in the axial direction and a turning direction;
a first biasing unit configured to apply biasing force to the valve element in the axial direction;
a second biasing unit configured to apply biasing force to the inner support portion in the axial direction;
a third biasing unit configured to apply biasing force to the outer support portion in the axial direction and the turning direction, wherein
the socket is capable of being set to an inserted state in which a plug is inserted in an airtight state, a semi-inserted state in which the plug is inserted in a non-airtight state, and a non-inserted state in which the plug is pulled out,
the socket allows insertion of a first plug in which an increased-diameter portion is formed in an intermediate portion thereof and a second plug in which a length of a front end portion protruding forward from the increased-diameter portion is longer than that in the first plug, as the plug,
in the inserted state, the increased-diameter portion of the plug is engaged with the first steel balls coming into contact with first grooves provided on an inner surface of the outer support portion and thereby being arranged at inner positions in a radial direction, and the second steel ball is movable in the axial direction in the second housing hole,
in the semi-inserted state, as a result of moving the outer support portion in the turning direction, the first steel balls are housed in second grooves, being deeper than the first grooves and provided on the inner surface of the outer support portion, and thus are arranged at outer positions in the radial direction, and the increased-diameter portion of the plug is disengaged from the first steel balls and engaged with the second steel ball, and
in the non-inserted state, as a result of moving the outer support portion in the axial direction, the first steel balls and the second steel ball are arranged at outer positions in the radial direction, and the increased-diameter portion of the plug is disengaged from the second steel ball,
the socket includes an 0-ring provided inside the inner support portion, and
the O-ring
comes into contact with a front end surface of the first plug when the first plug is inserted, and
comes into contact with an outer side surface of the second plug when the second plug is inserted.

2. The socket according to claim 1, wherein
the O-ring includes a first protruding portion protruding toward an inner side in the radial direction and a second protruding portion protruding toward the inner side more than the first protruding portion,
an outer side surface of the first plug comes into contact with the first protruding portion when the first plug is inserted, and
the outer side surface of the second plug comes into contact with the second protruding portion when the second plug is inserted.

3. The socket according to claim 1, wherein in the inserted state, the increased-diameter portion of the plug is engaged with the first steel balls and an outer end portion of the inner support portion comes into contact with the first steel balls.

4. A pipe connector comprising:
the socket according to claim 1; and
a plug configured to be inserted into the socket.

\* \* \* \* \*